US011892633B2

United States Patent
Lee et al.

(10) Patent No.: US 11,892,633 B2
(45) Date of Patent: Feb. 6, 2024

(54) DISPLAY APPARATUS INCLUDING VOLUME GRATING BASED COMBINER

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Changkun Lee, Seoul (KR); Byoungho Lee, Seoul (KR); Jinsoo Jeong, Seoul (KR); Seokil Moon, Seoul (KR); Geeyoung Sung, Daegu (KR); Hongseok Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 361 days.

(21) Appl. No.: 17/131,131

(22) Filed: Dec. 22, 2020

(65) Prior Publication Data
US 2021/0191129 A1 Jun. 24, 2021

Related U.S. Application Data

(60) Provisional application No. 62/952,699, filed on Dec. 23, 2019.

(30) Foreign Application Priority Data

Jan. 17, 2020 (KR) .................. 10-2020-0006743

(51) Int. Cl.
*G02B 27/01* (2006.01)
*G02B 27/44* (2006.01)
*G02B 26/08* (2006.01)

(52) U.S. Cl.
CPC ..... *G02B 27/0172* (2013.01); *G02B 27/0179* (2013.01); *G02B 27/44* (2013.01);
(Continued)

(58) Field of Classification Search
CPC ............ G02B 27/0172; G02B 27/0179; G02B 27/44; G02B 26/0858; G02B 2027/0178; G02B 2027/0187
(Continued)

(56) References Cited

U.S. PATENT DOCUMENTS 9,176,265 B2 11/2015 Mukawa et al.
10,151,874 B2 12/2018 Joo et al.
(Continued)

OTHER PUBLICATIONS

Andrew Maimone et al., "Pinlight Displays: Wide Field of View Augmented Reality Eyeglasses using Defocused Point Light Sources", ACM Transactions on Graphics, vol. 33, No. 4, Article 89, Jul. 2014, 11 pages total.

*Primary Examiner* — Collin X Beatty
(74) *Attorney, Agent, or Firm* — Sughrue Mion, PLLC

(57) ABSTRACT

A display apparatus including a volume grating-based combiner is disclosed. The display apparatus includes: an image providing device; and a combiner, wherein the combiner includes a plurality of volume gratings configured to diffract light containing an image, which is emitted from the image providing device, each volume grating has a first surface and a second surface facing each other, and each volume grating is further configured to diffract light incident on the first surface and transmit therethrough light incident on the second surface without diffraction.

25 Claims, 16 Drawing Sheets

(52) U.S. Cl.
CPC .. *G02B 26/0858* (2013.01); *G02B 2027/0178* (2013.01); *G02B 2027/0187* (2013.01)

(58) Field of Classification Search
USPC ........................................................ 359/630
See application file for complete search history.

(56) References Cited

U.S. PATENT DOCUMENTS

| | | | |
|---|---|---|---|
| 10,412,378 | B2 | 9/2019 | Lowney et al. |
| 2007/0070504 | A1* | 3/2007 | Akutsu ................... G02B 5/32 |
| | | | 359/566 |
| 2019/0086668 | A1 | 3/2019 | Ha |
| 2019/0324274 | A1* | 10/2019 | Kalinowski ........... G02F 1/0126 |
| 2019/0339436 | A1 | 11/2019 | Lee et al. |
| 2020/0064633 | A1* | 2/2020 | Maimone ................ G06F 3/013 |
| 2020/0183152 | A1* | 6/2020 | Pennell .................. G02B 6/005 |

* cited by examiner

DISPLAY APPARATUS INCLUDING VOLUME GRATING BASED COMBINER

CROSS-REFERENCE TO RELATED APPLICATIONS

This application is based on and claims priority under 35 U.S.C. § 119 to U.S. Provisional Application No. 62/952,699, filed on Dec. 23, 2019 in the U.S. Patent Office and Trademark Office, and Korean Patent Application No. 10-2020-0006743, filed on Jan. 17, 2020 in the Korean Intellectual Property Office, the disclosures of which are incorporated by reference herein in their entireties.

BACKGROUND

1. Field

Example embodiments of the present disclosure relate to a display apparatus, and more particularly, to a display apparatus including a volume grating based combiner.

2. Description of Related Art

Three-dimensional image display technology has been applied to various fields, and also has been recently applied to image devices for virtual reality (VR) displays and augmented reality (AG) displays.

Head mounted displays for VR are commercialized at present and tend to be widely applied in the entertainment industry. In addition, head mounted displays have been developed for medical, educational, and industrial fields.

As a development step for VR displays, AR displays have been developed to induce interactions between reality and an imagine as image devices for combining the real world and VR. Interactions between reality and VR are based on a function of providing information on a real situation in real-time and may further increase a reality effect by overlaying a virtual object or information on an environment of the real world. Such an AR display includes a combiner for combining a virtual image with an external real foreground and providing the combined image to an observer.

SUMMARY

Additional aspects will be set forth in part in the description which follows and, in part, will be apparent from the description, or may be learned by practice of example embodiments.

According to an aspect of an example embodiment, there is provided a display apparatus including an image providing device configured to provide an image, and a combiner configured to combine light containing the image, which is emitted from the image providing device, and light containing an external landscape, wherein the combiner includes a plurality of volume gratings configured to diffract the light containing the image emitted from the image providing device, wherein each volume grating of the plurality of volume gratings has a first surface and a second surface facing each other, and wherein each volume grating of the plurality of volume gratings is configured to diffract light incident on the first surface and transmit therethrough light incident on the second surface without diffraction.

Each volume grating of the plurality of volume gratings may be configured to diffract light incident on the first surface at a pre-defined incident angle toward a pre-defined direction.

The light containing the image, which is provided from the image providing device to each volume grating of the plurality of volume gratings, may be collimated parallel light.

Each volume grating of the plurality of volume gratings may be configured to have an optical characteristic having no refractive power with respect to the light incident on the first surface.

The light containing the image, which is provided from the image providing device to each volume grating of the plurality of volume gratings, may be diverging light.

Each volume grating of the plurality of volume gratings may be configured to collimate by diffraction the diverging light incident on the first surface into parallel light.

The combiner may further include a transparent substrate, and wherein the plurality of volume gratings may be provided on the transparent substrate in a two-dimensionally.

The image providing device may be further configured to provide the light containing the image toward the first surface of each volume grating of the plurality of volume gratings, and the plurality of volume gratings may be configured to diffract the light containing the image at different angles such that lights respectively diffracted by the plurality of volume gratings travel toward a single region.

The first surface of each volume grating of the plurality of volume gratings may have a circular shape, an oval shape, a quadrangular shape, or a hexagonal shape.

A distance between two adjacent volume gratings of the plurality of volume gratings may be greater than or equal to a width of each volume grating of the plurality of volume gratings.

The width of each volume grating of the plurality of volume gratings may range from 0.5 mm to 1.5 mm.

The distance between two adjacent volume gratings of the plurality of volume gratings may gradually increase or decrease away from a center of the combiner.

The width of each volume grating of the plurality of volume gratings may gradually increase or decrease away from a center of the combiner.

Some of the plurality of volume gratings may be provided in a line along a first row, and remaining ones of the plurality of volume gratings may be provided in a line along a second row adjacent to the first row, and volume gratings provided along the first row and volume gratings provided along the second row are provided to be mismatched with each other in a column direction.

Some of the plurality of volume gratings may be provided in a line along a first row, and remaining ones of the plurality of volume gratings may be provided in a line along a second row adjacent to the first row, and volume gratings provided along the first row and volume gratings provided along the second row are provided to face each other in a column direction.

The combiner may further include a transparent light guide plate through which light travels by total reflection, and an input coupler configured to guide the light containing the image, which is emitted from the image providing device, to an inside of the transparent light guide plate, wherein the transparent light guide plate has a first surface and a second surface facing each other, and wherein the plurality of volume gratings are provided on the second surface of the transparent light guide plate and configured to diffract the light containing the image toward the first surface of the transparent light guide plate.

The plurality of volume gratings may be provided such that the first surface of each volume grating is included inside the transparent light guide plate.

The plurality of volume gratings may be provided such that the first surface of each volume grating is in contact with the second surface of the transparent light guide plate.

The plurality of volume gratings may include a plurality of first volume gratings configured to diffract, at a first angle, light of a first wavelength band incident on the first surface at a pre-defined incident angle, a plurality of second volume gratings configured to diffract, at a second angle that is different from the first angle, light of a second wavelength band that is different from the first wavelength band, incident on the first surface at the pre-defined incident angle, and a plurality of third volume gratings configured to diffract, at a third angle that is different from the first angle and the second angle, light of a third wavelength band that is different from the first wavelength band and the second wavelength band, incident on the first surface at the pre-defined incident angle.

The plurality of first volume gratings, the plurality of second volume gratings, and the plurality of third volume gratings may be alternately provided one by one.

The display apparatus may further include an eye tracker configured to track a location of a pupil of an observer and measure a size of the pupil of the observer.

The image providing device may be further configured to adjust a beam diameter of light incident on the first surface of each volume grating of the plurality of volume gratings, based on information with respect to the location of the pupil of the observer or information with respect to the size of the pupil of the observer.

The display apparatus may further include a beam diameter adjustment device configured to adjust a beam diameter of light incident on the first surface of each volume grating of the plurality of volume gratings from the image providing device, based on information with respect to the location of the pupil of the observer or information with respect to the size of the pupil of the observer.

The beam diameter adjustment device may include one of an aperture having a variable opening, a lens having a variable focal length, a diffusion plate having a variable diffusion angle, a micro-electromechanical systems (MEMS) mirror array configured to electrically adjust a reflective region, and an actuator configured to move the image providing device to adjust a distance between the combiner and the image providing device.

The beam diameter adjustment device may be configured to decrease a beam diameter of light incident on the first surface of each volume grating of the plurality of volume gratings based on a distance between the combiner and the observer decreasing or the size of the pupil of the observer increasing, and to increase the beam diameter of the light incident on the first surface of each volume grating of the plurality of volume gratings based on the distance between the combiner and the observer increasing or the size of the pupil of the observer decreasing.

The display apparatus may be a virtual reality (VR) display apparatus, an augmented reality (AR) display apparatus, or a mixed reality (MR) display apparatus of a head mounting type, an eyeglasses type, or a goggle type.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
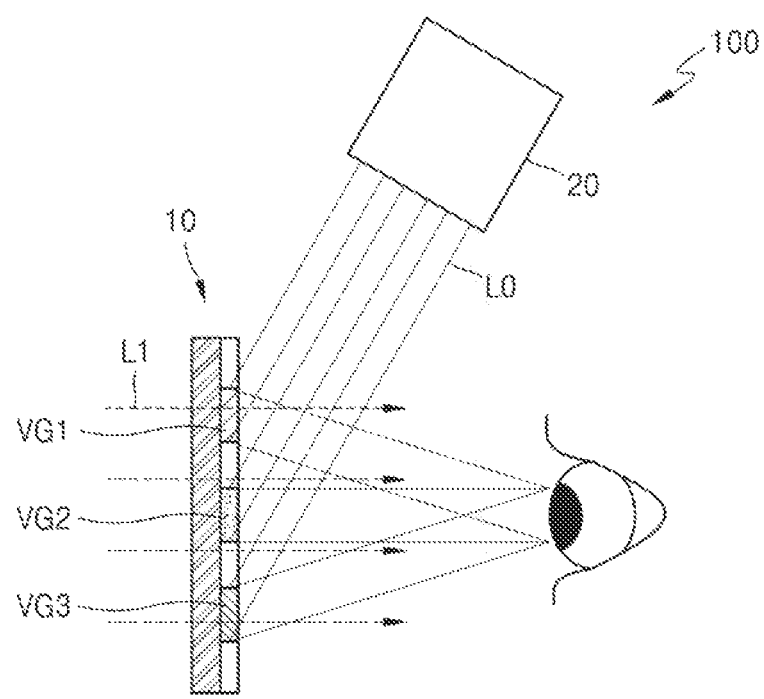
FIG. 1 is a view of a configuration of a display apparatus according to an example embodiment.

Reference will now be made in detail to example embodiments which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a display apparatus including a volume grating-based combiner will be described in detail with reference to the accompanying drawings. In the drawings, the sizes of constituent elements may be exaggerated for clarity. In addition, the embodiments described below are only illustrative, and various changes in form and details may be made therein.

Hereinafter, the term "above" or "on" may include not only directly on in a contact manner but also above in a contactless manner. An expression in the singular includes an expression in the plural unless they are clearly different from each other in context. In addition, when a certain part "includes" a certain component, this indicates that the part may further include another component instead of excluding another component unless there is different disclosure.

The use of the term "the" or a similar directional term may correspond to both the singular and the plural. For steps forming the methods, if an order is not clearly disclosed or, if there is no disclosure opposed to the clear order, the steps may be performed in any order deemed proper, and the methods are not necessarily limited to the disclosed order of the steps.

In addition, terms such as " . . . unit", " . . . module", and the like refer to units that perform at least one function or operation, and the units may be implemented as hardware or software or as a combination of hardware and software.

Connections or connection members of lines between components shown in the drawings illustrate functional connections and/or physical or circuit connections, and the connections or connection members may be represented by replaceable or additional various functional connections, physical connections, or circuit connections in an actual apparatus.

The use of all illustrations or illustrative terms is simply to describe the technical idea in detail, and the scope is not limited due to the illustrations or illustrative terms unless they are limited by claims.

FIG. 1 is a view of a configuration of a display apparatus according to an example embodiment. Referring to FIG. 1, a display apparatus 100 according to an example embodiment may include an image providing device 20 for providing an image and a combiner 10 configured to combine light L0 containing the image, which is emitted from the image providing device 20, and light L1 containing an external landscape.

The image providing device 20 may include a spatial light modulator or a display panel for forming an image containing virtual reality or virtual information. The display panel may include, for example, a liquid crystal display panel or an organic light-emitting display panel. In addition, the image providing device 20 may include a projector for projecting the light L0 containing the image to the combiner 10. Therefore, the image providing device 20 may project the light L0 containing the image, which is formed by the spatial light modulator or the display panel, to the combiner 10. For example, the image providing device 20 may collimate the light L0 containing the image to make parallel light, and project the parallel light to the combiner 10.

The combiner 10 is configured to combine the light L0 containing the image, which is projected from the image providing device 20, and the light L1 containing the external landscape and provide the combined image to an observer. For example, the combiner 10 may be configured to change a traveling direction of the light L0 containing the image, which is projected from the image providing device 20, to a particular direction by diffracting the light L0 containing the image and transmit the light L1 containing the external landscape therethrough without diffraction. The external light L1 contains a real landscape existing in front of the observer and not an artificial image modulated and generated by a separate spatial light modulator or displayed by a separate display panel. Therefore, the observer may observe both an artificially generated virtual image and a real landscape. Accordingly, the display apparatus 100 according to the example embodiment may be applied to implement augmented reality (AR) or mixed reality (MR). For example, the display apparatus 100 according to the example embodiment may be a near-eye AR display apparatus. For example, when the display apparatus 100 is used, the combiner 10 may be arranged in front of an eye of the observer.

To diffract the light L0 containing the image, which is projected from the image providing device 20, such that the light L0 containing the image travels toward the eye of the observer, the combiner 10 may include a plurality of volume gratings VG1, VG2, and VG3. A volume grating may include an interference pattern formed by interference between reference light and signal light. The interference pattern may vary according to a wavelength of the reference light, an incident angle of the reference light, a traveling direction of the signal light, and a form of the signal light. When light having the same wavelength as the reference light is incident on this volume grating at the same incident angle as that of the reference light, the reference light is diffracted by the interference pattern of the volume grating such that the same light as the signal light is reproduced. Therefore, according to interference patterns of volume gratings, various forms of signal light may be generated.

According to the example embodiment, each of the plurality of volume gratings VG1, VG2, and VG3 is configured to diffract light incident at a pre-defined particular incident angle toward a pre-defined particular direction. For example, the light L0 containing the image, which is projected from the image providing device 20, acts as the reference light, and the plurality of volume gratings VG1, VG2, and VG3 may be configured to diffract the light L0 containing the image, which is incident at the pre-defined particular incident angle, and reproduce signal light containing an image, which travels toward the eye of the observer.

The plurality of volume gratings VG1, VG2, and VG3 are locally formed on the surface of the combiner 10 and separated from each other. The plurality of volume gratings VG1, VG2, and VG3 arranged at different locations may diffract the light L0 containing the image at different angles such that lights respectively diffracted from the plurality of volume gratings VG1, VG2, and VG3 travel toward a single same region and are incident on the eye of the observer, particularly, the pupil of the eye of the observer. For example, the volume grating VG1 located to be higher than the eye of the observer may be configured to diffract downward the light L0 projected from the image providing device 20, the volume grating VG2 located at the same height as the eye of the observer may be configured to diffract, in a normal direction with respect to the grating VG2, the light L0 projected from the image providing device 20, and the volume grating VG3 located to be lower than the eye of the observer may be configured to diffract upward the light L0 projected from the image providing device 20.

The image providing device 20 may be configured to individually project the light L0 containing the image to the plurality of volume gratings VG1, VG2, and VG3. For example, the image providing device 20 may generate a plurality of parallel light beams respectively corresponding to the plurality of volume gratings VG1, VG2, and VG3 and individually project the plurality of parallel light beams to the plurality of volume gratings VG1, VG2, and VG3, respectively. The image providing device 20 may be configured to project the light L0 containing the image toward the entire region of the combiner 10. In this case, the light L0 is diffracted only in regions in which the plurality of volume gratings VG1, VG2, and VG3 are formed among the entire region of the combiner 10. In any case, the light L0 containing the image, which is projected from the image providing device 20, may be incident on the plurality of volume gratings VG1, VG2, and VG3 at the same incident angle.

In addition, each volume grating VG1, VG2, or VG3 may be configured such that light diffracted by each volume grating VG1, VG2, or VG3 and traveling toward the eye of the observer is parallel light. Therefore, the light L0 which contains the image and is incident on each volume grating VG1, VG2, or VG3 may be parallel light, and light traveling from each volume grating VG1, VG2, or VG3 toward the eye of the observer may also be parallel light. In this case, each volume grating VG1, VG2, or VG3 may have an optical characteristic having no refractive power like a plane mirror.

Figure 2:
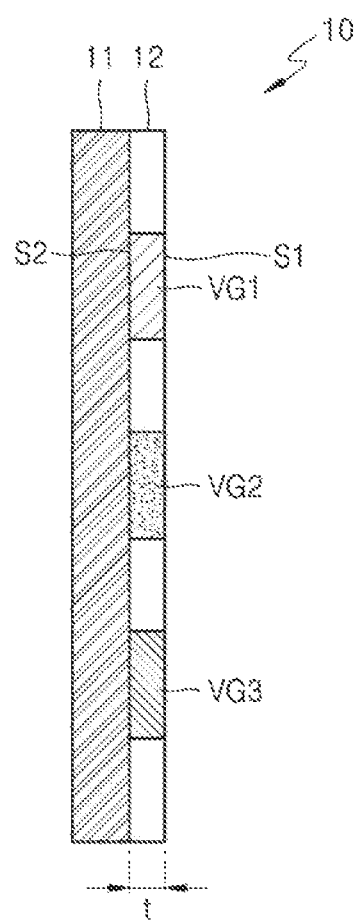
FIG. 2 is a cross-sectional view of a configuration of a combiner of the display apparatus illustrated in FIG. 1.

FIG. 2 is a cross-sectional view of a configuration of the combiner 10 of the display apparatus 100 illustrated in FIG. 1. Referring to FIG. 2, the combiner 10 may include a transparent substrate 11 made of a material such as glass or plastic transparent to visible light and a photosensitive layer 12 arranged on the surface of the transparent substrate 11. The plurality of volume gratings VG1, VG2, and VG3 are formed inside the photosensitive layer 12. Each volume grating VG1, VG2, or VG3 may have a thin thickness t of, for example, about 100 μm. Therefore, the combiner 10 and the display apparatus 100 may be produced with a sufficiently thin thickness.

In addition, each volume grating VG1, VG2, or VG3 may have a first surface S1 and a second surface S2 facing each other. For example, when the display apparatus 100 is used, the first surface S1 of each volume grating VG1, VG2, or VG3 may be arranged toward the eye of the observer, and the second surface S2 of each volume grating VG1, VG2, or VG3 may be arranged toward an external landscape. In this case, each volume grating VG1, VG2, or VG3 may be configured to diffract light incident on the first surface S1 and transmit therethrough light incident on the second surface S2 without refraction. The image providing device 20 may be arranged to project the light L0 containing the image to the first surface S1 of each volume grating VG1, VG2, or VG3. Then, the plurality of volume gratings VG1, VG2, and VG3 may diffract the light L0 containing the image toward the eye of the observer and transmit the external light L1 therethrough without refraction.

FIG. 2 shows, in the cross-sectional view, that three volume gratings VG1, VG2, and VG3 are arranged in a vertical direction, but embodiments are not necessarily limited thereto. For example, a greater number of volume gratings may be arranged on the transparent substrate 11 in a two-dimensional array form. For example, FIGS. 3A to 3D are top views of various arrangements of a plurality of volume gratings arranged on the combiner 10 illustrated in FIG. 2.

Figure 3A:
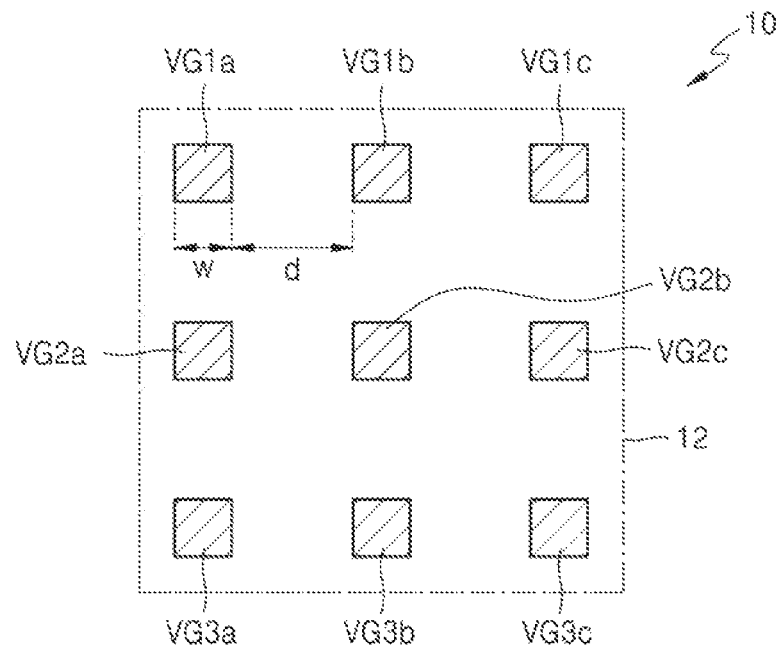
FIGS. 3A, 3B, 3C, and 3D are top views of various arrangements of a plurality of volume gratings arranged on the combiner illustrated in FIG. 2.

First, referring to FIG. 3A, the combiner 10 may include a plurality of two-dimensionally arranged volume gratings VG1a, VG1b, VG1c, VG2a, VG2b, VG2c, VG3a, VG3b, and VG3c. As shown in FIG. 3A, the plurality of volume gratings VG1a, VG1b, VG1c, VG2a, VG2b, VG2c, VG3a, VG3b, and VG3c may be arranged in a line in a row direction and a column direction. For example, a plurality of volume gratings VG1a, VG1b, and VG1c may be arranged in a line along a first row, a plurality of volume gratings VG2a, VG2b, and VG2c, may be arranged in a line along a second row, and a plurality of volume gratings VG3a, VG3b, and VG3c may be arranged in a line along a third row. In addition, the plurality of volume gratings arranged along different rows may be arranged to face each other in the column direction. For example, a plurality of volume gratings VG1a, VG2a, and VG3a may be arranged in a line along a first column, a plurality of volume gratings VG1b, VG2b, and VG3b may be arranged in a line along a second column, and a plurality of volume gratings VG1c, VG2c, and VG3c may be arranged in a line along a third column. Although FIG. 3A shows that a plurality of volume gratings are arranged in three rows and in three columns, this is only an example, and embodiments are not necessarily limited thereto. For example, volume gratings may be arranged in two rows or two columns, or volume gratings may be arranged in four or more rows or four or more columns.

Each volume grating may have, for example, a quadrangular shape. A distance d between two adjacent volume gratings may be greater than or equal to a width w of each volume grating. For example, the width w of each volume grating may be about 0.5 mm to about 1.5 mm. Because a size of each volume grating is very small, each volume grating may act as a pinhole. Therefore, because image information is delivered to the observer through a small opening such as a pinhole, a depth of focus may be long. In addition, an angle of view may increase by using a plurality of volume gratings.

The widths w of the plurality of volume gratings may not all be the same. In addition, the distances d between the plurality of volume gratings may not be all the same. For example, sizes of the widths w of the plurality of volume gratings and the distances d between the plurality of volume gratings may vary according to relative locations from the eye of the observer. For example, the width w of each volume grating may gradually increase or decrease away from the center of the combiner 10, and the distance d between two adjacent volume gratings may gradually increase or decrease away from the center of the combiner 10.

Figure 3B:
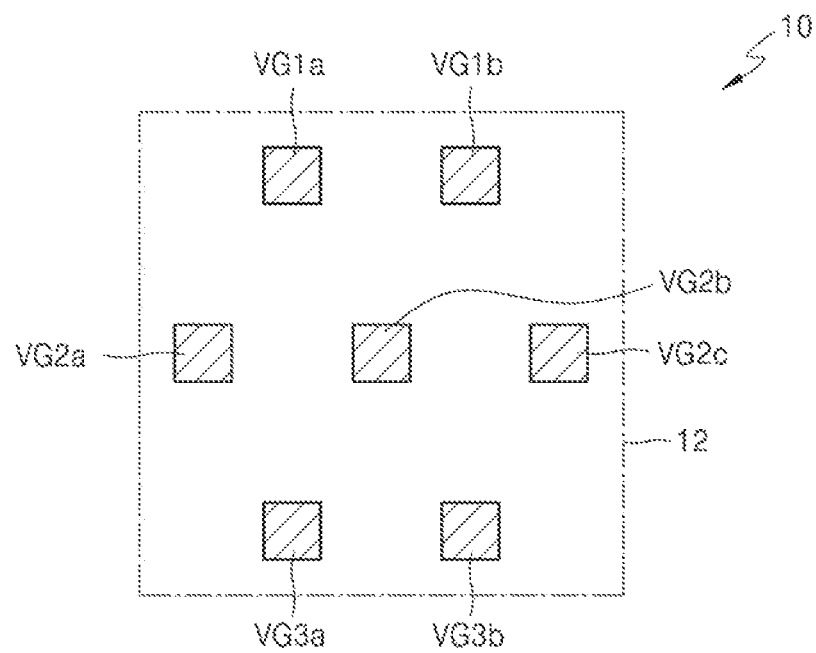

In addition, referring to FIG. 3B, a plurality of volume gratings VG1a, VG1b, VG2a, VG2b, VG2c, VG3a, and VG3b may be two-dimensionally arranged to be mismatched with each other. For example, a plurality of volume gratings VG1a and VG1b may be arranged in a line along the first row, a plurality of volume gratings VG2a, VG2b, and VG2c may be arranged in a line along the second row, a plurality of volume gratings VG3a and VG3b may be arranged in a line along the third row, and the volume gratings VG1a and VG1b of the first row and the volume gratings VG3a and VG3b of the third row may be arranged to be mismatched with the volume gratings VG2a, VG2b, and VG2c of the second row. For example, the volume gratings VG1a and VG1b of the first row and the volume gratings VG3a and VG3b of the third row may be located between the volume gratings VG2a, VG2b, and VG2c of the second row in a horizontal direction.

Figure 3C:
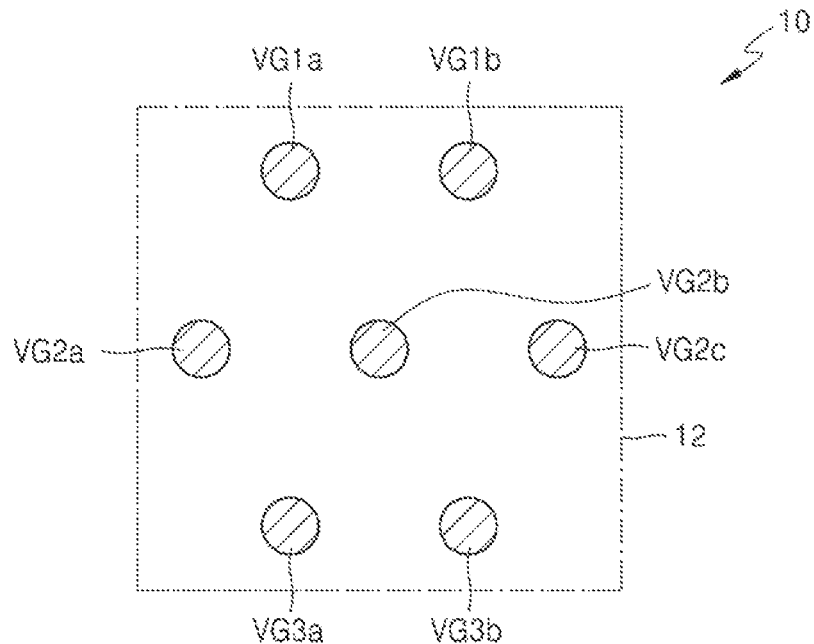
Figure 3D:
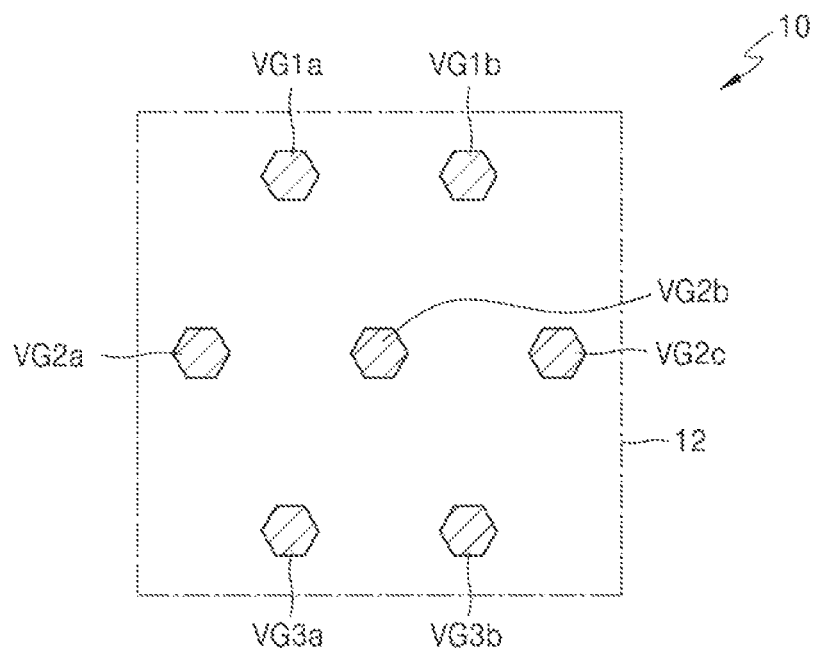

Although FIGS. 3A and 3B show that each volume grating has a quadrangular shape, this is only an example, and a shape of each volume grating is not necessarily limited to the quadrangular shape. For example, as shown in FIG. 3C, each volume grating VG1a, VG1b, VG2a, VG2b, VG2c, VG3a, or VG3b may have a circular or oval shape. As shown in FIG. 3D, each volume grating VG1a, VG1b, VG2a, VG2b, VG2c, VG3a, or VG3b may have a hexagonal shape. In addition, although FIGS. 3A to 3D show that a plurality of volume gratings in one combiner 10 have the same shape, embodiments are not necessarily limited thereto. For example, a plurality of volume gratings may have different shapes according to beam cross-sectional shapes of the light L0 containing the image, which is projected from the image providing device 20, and locations of the plurality of volume gratings.

As described above, a volume grating includes an interference pattern formed by interference between reference light an signal light. A method of forming an interference pattern of a volume grating having the optical characteristics described above includes a hologram recording method and a method using a holographic printer.

Figure 4A:
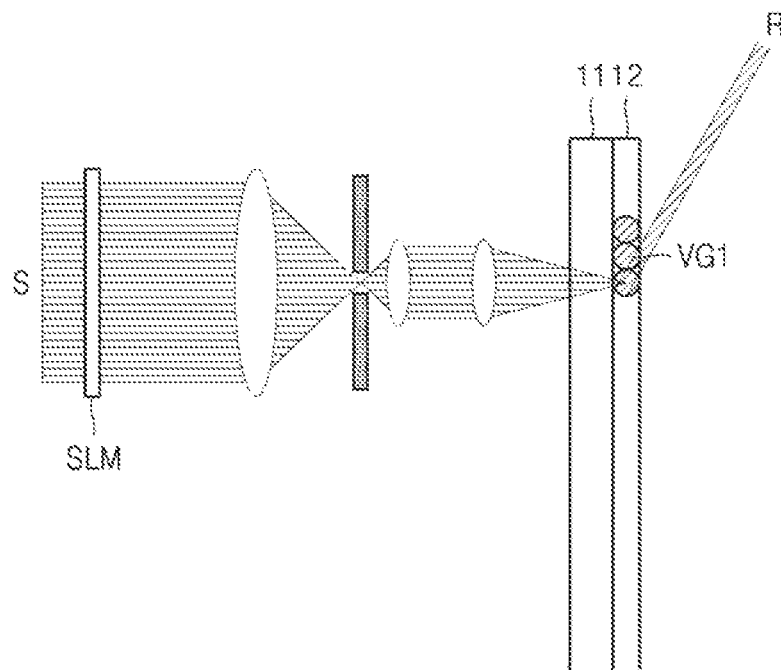
FIGS. 4A, 4B, and 4C are views of a process of producing the combiner illustrated in FIG. 2 by using a holographic printer.
Figure 4B:
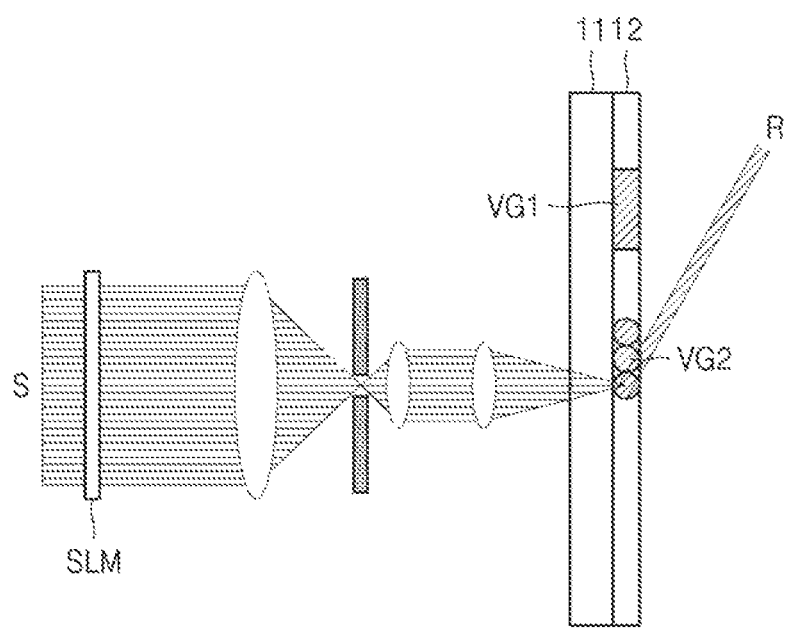
Figure 4C:
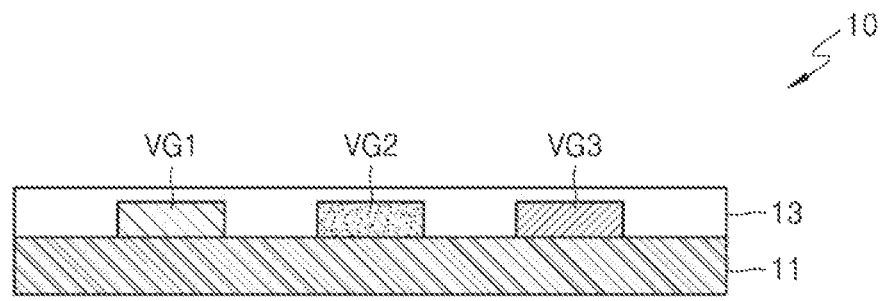

For example, FIGS. 4A to 4C are views of a process of producing the combiner 10 illustrated in FIG. 2 by using a holographic printer. First, referring to FIG. 4A, reference light R and signal light S are simultaneously emitted on the same location of the photosensitive layer 12 on the transparent substrate 11, such that the reference light R interferes with the signal light S. A beam diameter of the reference light R and a beam diameter of the signal light S are smaller than a size of one volume grating VG1. An interference pattern formed by the reference light R and the signal light S is a hogel that is a unit constituting the volume grating VG1. The one volume grating VG1 may be constructed by a plurality of two-dimensionally arranged hogels. An interference pattern of the hogels is determined by a beam profile of the signal light S. The beam profile of the signal light S may be modulated to a desired shape by a spatial light modulator SLM. For example, the beam profile of the signal light S may vary according to a computer generated hologram (CGH) signal applied to the spatial light modulator SLM of the holographic printer.

Therefore, an optical characteristic of the volume grating VG1 formed on the combiner 10 may be more easily determined according to the CGH signal applied to the spatial light modulator SLM of the holographic printer. In addition, a location and a shape of the volume grating VG1 formed on the combiner 10 may be more easily determined according to a forming location and an arrangement shape of the plurality of hogels. For example, an interference pattern and a location of the plurality of hogels may be determined by considering a pre-defined optical characteristic of the volume grating VG1. In addition, the one volume grating VG1 may be formed by calculating a CGH signal for forming a determined interference pattern of a hogel and then by sequentially forming a plurality of hogels in the photosensitive layer 12 while applying the calculated CGH signal to the spatial light modulator SLM.

After completing the one volume grating VG1 in this way, as shown in FIG. 4B, a subsequent volume grating VG2 may be formed by moving a location at which hogels are formed. The volume grating VG2 may be formed by previously determining an interference pattern and a location of a plurality of hogels in consideration of an optical characteristic of the volume grating VG2 to be formed and sequentially forming the plurality of hogels inside the photosensitive layer 12 while applying, to the spatial light modulator SLM, a CGH signal calculated based on the interference pattern and the location. In this way, the combiner 10 may be produced by forming a plurality of two-dimensionally arranged volume gratings with a holographic printer.

After completing all of a plurality of volume gratings, a residual part of the photosensitive layer 12 in which no volume gratings are formed may remain as it is or be removed. For example, referring to FIG. 4C, after removing a residual part of the photosensitive layer 12 in which the plurality of volume gratings VG1, VG2, and VG3 are not formed, a transparent protective layer 13 covering the plurality of volume gratings VG1, VG2, and VG3 may be formed on the transparent substrate 11.

Figure 5A:
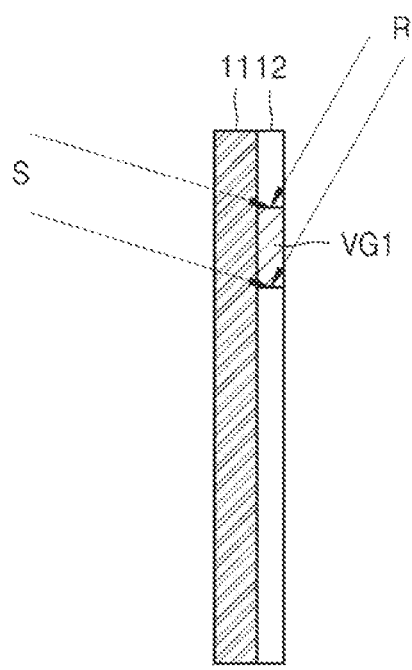
FIGS. 5A, 5B, and 5C are views of a process of producing the combiner illustrated in FIG. 2 by using a general hologram recording method.
Figure 5B:
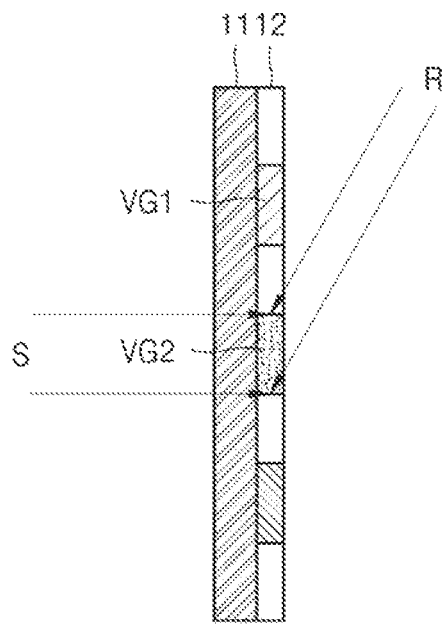
Figure 5C:
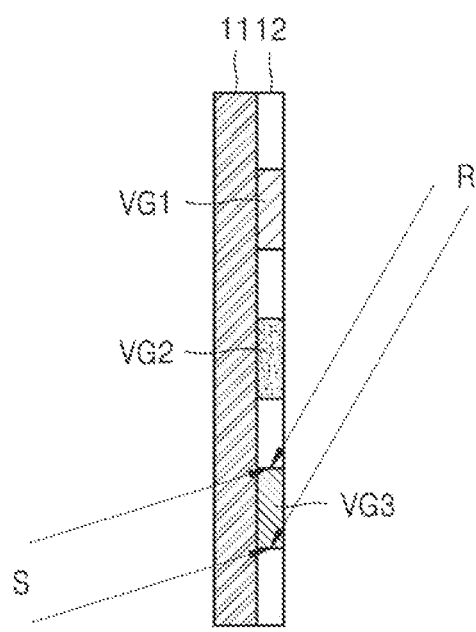

In addition, FIGS. 5A to 5C are views of a process of producing the combiner 10 illustrated in FIG. 2 by using a hologram recording method. First referring to FIG. 5A, the reference light R and the signal light S are simultaneously emitted on the same location of the photosensitive layer 12 on the transparent substrate 11, such that the reference light R interferes with the signal light S. The location on which the reference light R and the signal light S are emitted is the same as a location of the volume grating VG1 to be formed. The reference light R is incident on the photosensitive layer 12 at the same incident angle as an incident angle at which the light L0 containing the image, which is emitted from the image providing device 20, is incident on the volume grating VG1. In addition, the reference light R is the same parallel light as the light L0 containing the image, which is emitted from the image providing device 20. The signal light S is incident on the photosensitive layer 12 in the same direction as a direction in which the light L0 containing the image is diffracted by the volume grating VG1 and then travels. In addition, a beam cross-sectional shape of the reference light R and a beam cross-sectional shape of the signal light S may be the same as a shape of the volume grating VG1 to be formed. In this case, the volume grating VG1 may be formed by a single occurrence of interference between the reference light R and the signal light S.

As shown in FIG. 5B, the volume grating VG2 may be formed by emitting the reference light R and the signal light S on the same location on the photosensitive layer 12 as a location of the volume grating VG2. The signal light S is incident on the photosensitive layer 12 in the same direction as a direction in which the light L0 containing the image is diffracted by the volume grating VG2 and then travels. Likewise, as shown in FIG. 5C, the volume grating VG3 may be formed by emitting the reference light R and the signal light S on the same location on the photosensitive layer 12 as a location of the volume grating VG3. The signal light S is incident on the photosensitive layer 12 in the same direction as a direction in which the light L0 containing the image is diffracted by the volume grating VG3 and then travels. After forming all of the plurality of volume gratings VG1, VG2, and VG3, as shown in FIG. 4C, a part of the photosensitive layer 12 in which the plurality of volume gratings VG1, VG2, and VG3 are not formed may be removed, and the transparent protective layer 13 covering the plurality of volume gratings VG1, VG2, and VG3 may be formed on the transparent substrate 11.

Volume gratings formed by the holographic printing method or the hologram recording method described above may react only to light incident in a particular direction. For example, the volume gratings diffract only the light L0 containing the image, which is obliquely incident on the first surface S1 of FIG. 2 at a predetermined angle. The volume gratings may transmit therethrough, without diffraction, light incident in a different direction or at a different angle from that of the light L0 containing the image. Therefore, the combiner 10 according to the example embodiment may efficiently combine the light L0 containing the image and the light L1 containing the external landscape, and provide the combined light to the observer.

In addition, the combiner 10 used in the display apparatus 100 according to the example embodiment may be more easily produced using a holographic printer. When a holographic printer is used, an optical characteristic of volume gratings formed in the combiner 10 may be more easily determined according to a CGH signal applied to the spatial light modulator SLM of the holographic printer, and a location and a shape of the volume gratings formed in the combiner 10 may be more easily determined according to a location and an arrangement of hogels. Therefore, optical efficiency of the combiner 10 with respect to the light L0 containing the image may be optimized, and the combiner 10 having high transmittance and low noise with respect to the light L1 containing the external landscape may be implemented.

Figure 6:
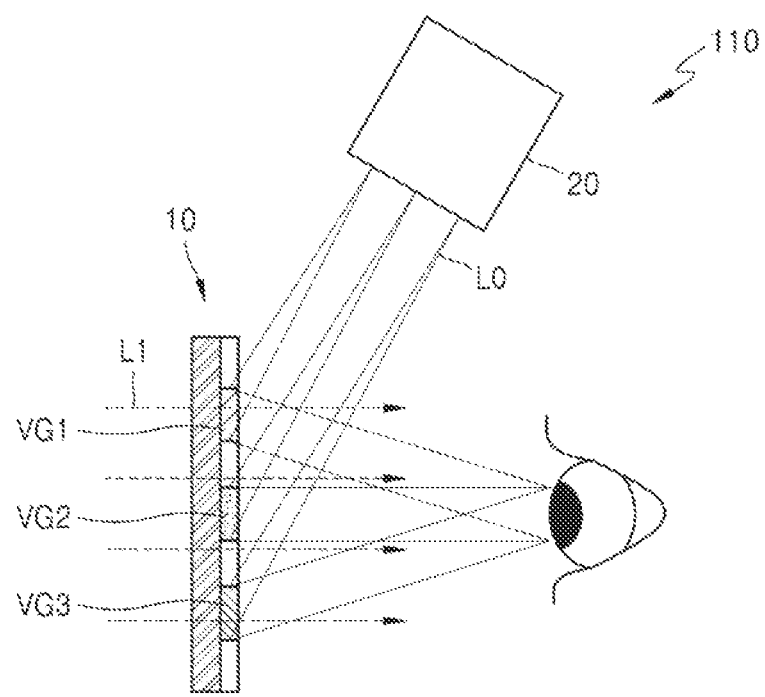
FIG. 6 is a view of a configuration of a display apparatus according to another example embodiment.

FIG. 6 is a view of a configuration of a display apparatus 110 according to another example embodiment. Referring to FIG. 6, the light L0 containing the image, which is projected from the image providing device 20 to the plurality of volume gratings VG1, VG2, and VG3 in the combiner 10, may be diverging light having a beam diameter gradually increasing in a traveling direction. In this case, each volume grating VG1, VG2, or VG3 may be configured to diffract diverging light incident on the first surface S1 (see FIG. 2) thereof and collimate the diffracted light into parallel light.

For example, the volume grating VG1 located to be higher than the eye of the observer may be configured to diffract downward the light L0 projected from the image providing device 20 and collimate the diffracted light into parallel light. The volume grating VG2 located at the same height as the eye of the observer may be configured to diffract, in a normal direction, the light L0 projected from the image providing device 20 and collimate the diffracted light into parallel light. The volume grating VG3 located to be lower than the eye of the observer may be configured to diffract upward the light L0 projected from the image providing device 20 and collimate the diffracted light into parallel light. Accordingly, the plurality of volume gratings VG1, VG2, and VG3 shown in FIG. 6 may have an optical characteristic having positive (+) refractive power similar to a concave mirror.

The plurality of volume gratings VG1, VG2, and VG3 shown in FIG. 6 may also be formed by a holographic printing method or a hologram recording method. For the holographic printing method, a CGH signal may be calculated by considering that the light L0 containing the image, which is projected from the image providing device 20 to the plurality of volume gratings VG1, VG2, and VG3, is diverging light. In addition, the plurality of volume gratings VG1, VG2, and VG3 may have the optical characteristic illustrated in FIG. 6 by forming a plurality of hogels according to the CGH signal applied to the spatial light modulator SLM.

Figure 7A:
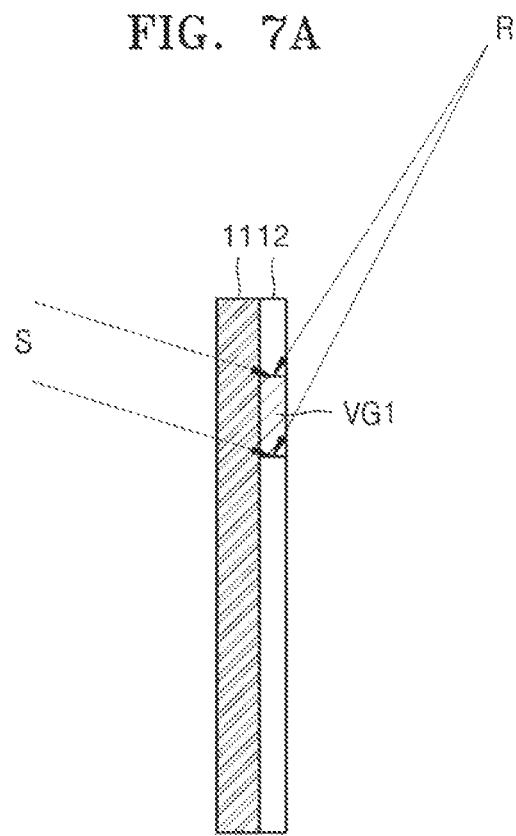
FIGS. 7A, 7B, and 7C are views of a process of producing a combiner illustrated in FIG. 6 by using a general hologram recording method.
Figure 7B:
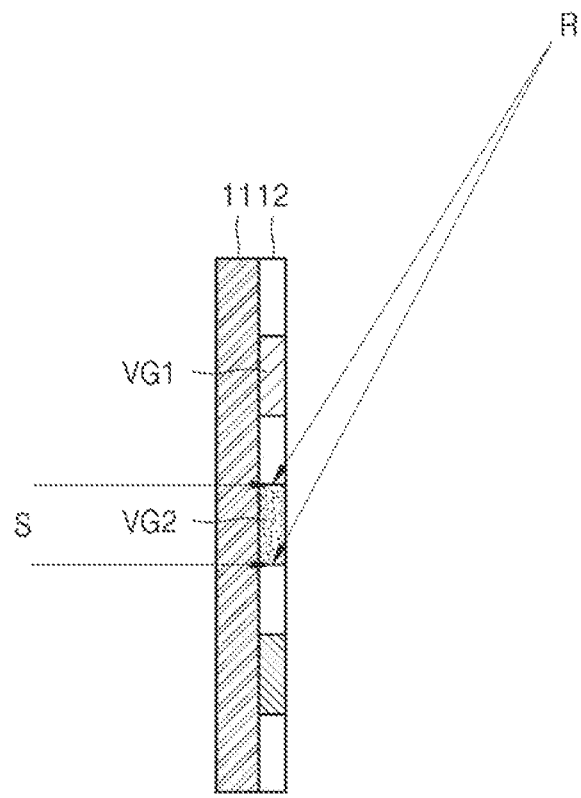
Figure 7C:
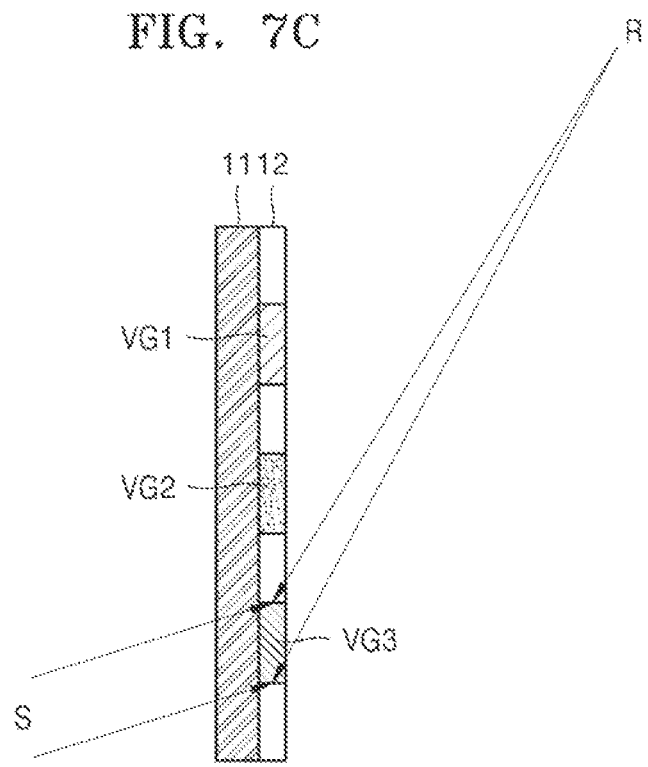

FIGS. 7A to 7C are views of a process of producing the combiner 10 illustrated in FIG. 6 by using a general hologram recording method. Referring to FIGS. 7A to 7C, the reference light R is the same diverging light as the light L0 containing the image, which is emitted from the image providing device 20. The other process illustrated in FIGS. 7A to 7C is the same as described with reference to FIGS. 5A to 5C.

Figure 8:
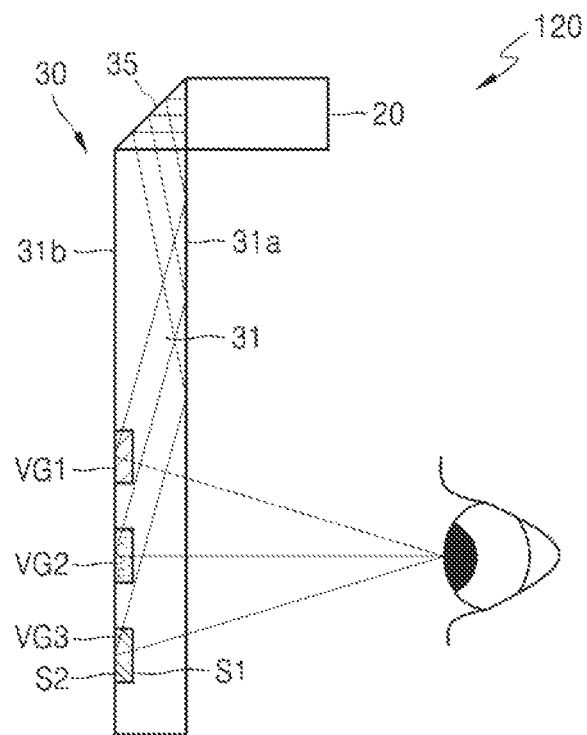
FIG. 8 is a view of a configuration of a display apparatus according to another example embodiment.

FIG. 8 is a view of a configuration of a display apparatus 120 according to another example embodiment. Referring to FIG. 8, a combiner 30 of the display apparatus 120 may include a transparent light guide plate 31 through which light travels by total reflection and an input coupler 35 configured to guide light containing an image, which is emitted from the image providing device 20, to the inside of the transparent light guide plate 31. For example, the input coupler 35 may have a prism shape and be arranged between a light incident surface of the transparent light guide plate 31 and the image providing device 20.

The transparent light guide plate 31 may have a first surface 31a and a second surface 31b facing each other. When the display apparatus 120 is used, the combiner 30 may be arranged such that the first surface 31a of the transparent light guide plate 31 faces the eye of the observer. The plurality of volume gratings VG1, VG2, and VG3 may be configured to diffract the light containing the image toward the first surface 31a of the transparent light guide plate 31 by being arranged on the second surface 31b of the transparent light guide plate 31. The light containing the image, which is diffracted by the plurality of volume gratings VG1, VG2, and VG3, may exit from the first surface 31a of the transparent light guide plate 31 and be incident on the eye of the observer.

In the example embodiment illustrated in FIG. 8, the combiner 30 may not include a transparent substrate and a photosensitive layer. The plurality of volume gratings VG1, VG2, and VG3 may be included and buried inside the transparent light guide plate 31. For example, the first surfaces S1 of the plurality of volume gratings VG1, VG2, and VG3 may face the first surface 31a of the transparent light guide plate 31 in the inside of the transparent light guide plate 31. In addition, the second surfaces S2 of the plurality of volume gratings VG1, VG2, and VG3 may coincide with the second surface 31b of the transparent light guide plate 31.

Figure 9:
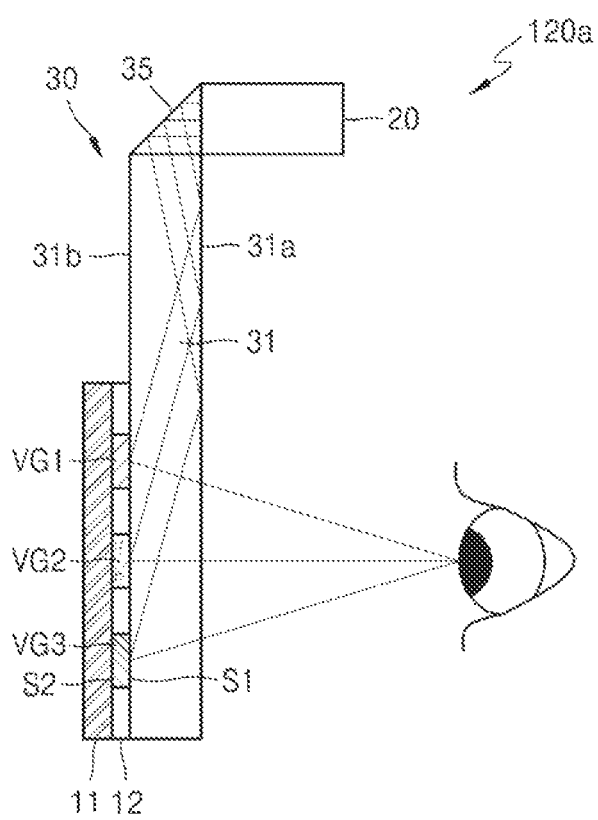
FIG. 9 is a view of a configuration of a display apparatus according to another example embodiment.

FIG. 9 is a view of a configuration of a display apparatus 120a according to another example embodiment. Referring to FIG. 9, unlike the configuration of the combiner 30 illustrated in FIG. 8, a combiner 30' of the display apparatus 120a may further include the transparent substrate 11 and the photosensitive layer 12. In this example, the plurality of volume gratings VG1, VG2, and VG3 may be arranged such that the first surfaces S1 thereof are in contact with the second surface 31b of the transparent light guide plate 31.

The plurality of volume gratings VG1, VG2, and VG3 described above may be configured to react to light of all wavelengths. For example, each of the plurality of volume gratings VG1, VG2, and VG3 described above may be configured to diffract all of incident light of a red band, incident light of a green band, and incident light of a blue band in the same direction. However, in this case, diffraction efficiency of the plurality of volume gratings VG1, VG2, and VG3 may be relatively low. Therefore, when volume gratings are configured to react only to light of a particular wavelength band, diffraction efficiency of the volume gratings may be improved.

Figure 10:
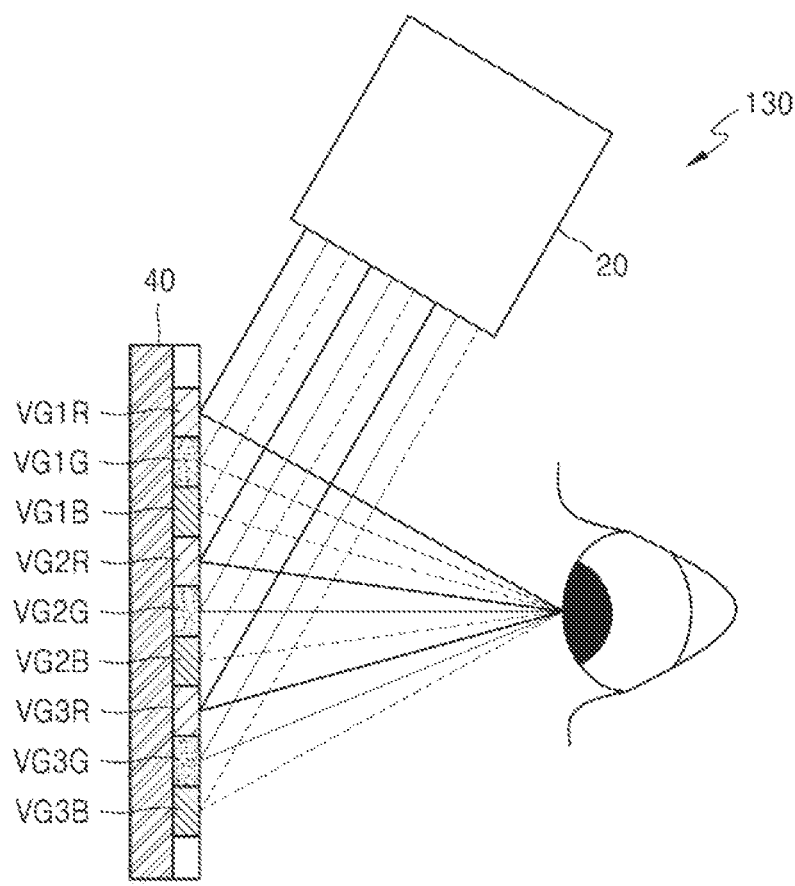
FIG. 10 is a view of a configuration of a display apparatus according to another example embodiment.

For example, FIG. 10 is a view of a configuration of a display apparatus 130 according to another example embodiment. Referring to FIG. 10, a combiner 40 of the display apparatus 130 may include a plurality of first volume gratings VG1R, VG2R, and VG3R configured to diffract only light of the red band, which is incident on the first surface S1 at a pre-defined particular incident angle, a plurality of second volume gratings VG1G, VG2G, and VG3G configured to diffract only light of the green band, which is incident on the first surface S1 at a pre-defined particular incident angle, and a plurality of third volume gratings VG1B, VG2B, and VG3B configured to diffract only light of the blue band, which is incident on the first surface S1 at a pre-defined particular incident angle. The plurality of first volume gratings VG1R, VG2R, and VG3R may diffract light of the red band at a pre-defined particular angle, for example, toward the eye of the observer. In addition, the plurality of second volume gratings VG1G, VG2G, and VG3G may diffract light of the green band at a pre-defined particular angle, for example, toward the eye of the observer, and the plurality of third volume gratings VG1B, VG2B, and VG3B may diffract light of the blue band at a pre-defined particular angle, for example, toward the eye of the observer. Then, the observer may view a color image including the red light, the green light, and the blue light.

Figure 11:
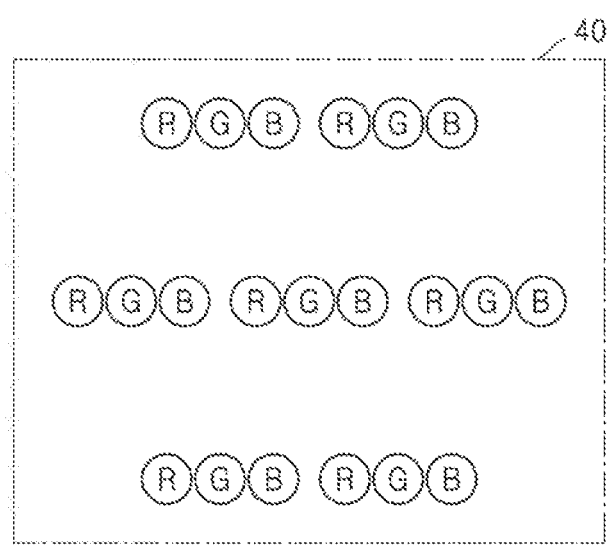
FIG. 11 is an exemplary view of an arrangement of a plurality of volume gratings arranged on a combiner according to another example embodiment.

FIG. 10 shows that the plurality of first volume gratings VG1R, VG2R, and VG3R, the plurality of second volume gratings VG1G, VG2G, and VG3G, and the plurality of third volume gratings VG1B, VG2B, and VG3B are alternately arranged in the vertical direction one by one. However, this is only an example, and an arrangement of volume gratings is not necessarily limited thereto. For example, FIG. 11 is an exemplary view of an arrangement of a plurality of volume gratings arranged on the combiner 40, according to another example embodiment. As shown in FIG. 11, a plurality of first volume gratings R configured to diffract light of the red band, a plurality of second volume gratings G configured to diffract light of the green band, and a plurality of third volume gratings B configured to diffract light of the blue band may be alternately arranged in the horizontal direction one by one. In addition, for example, the plurality of first volume gratings R, the plurality of second volume gratings G, and the plurality of third volume gratings B may be alternately arranged in a diagonal direction one by one.

In the display apparatuses according to the example embodiments described above, because a size of volume gratings is small, a long depth of focus may be achieved according to the principle of pinhole. However, because a size of volume gratings cannot be zero, an image may not be focused according to a location change of the pupil of the observer or a size change of the pupil. In this case, to focus an image, an effective reaction area of an opening may be actively adjusted in response to a location change of the pupil of the observer or a size change of the pupil. However, because it is difficult to actively change a size of volume gratings, a beam diameter of light containing an image, which is projected from the image providing device 20 and incident to the volume gratings, may be actively adjusted.

Figure 12:
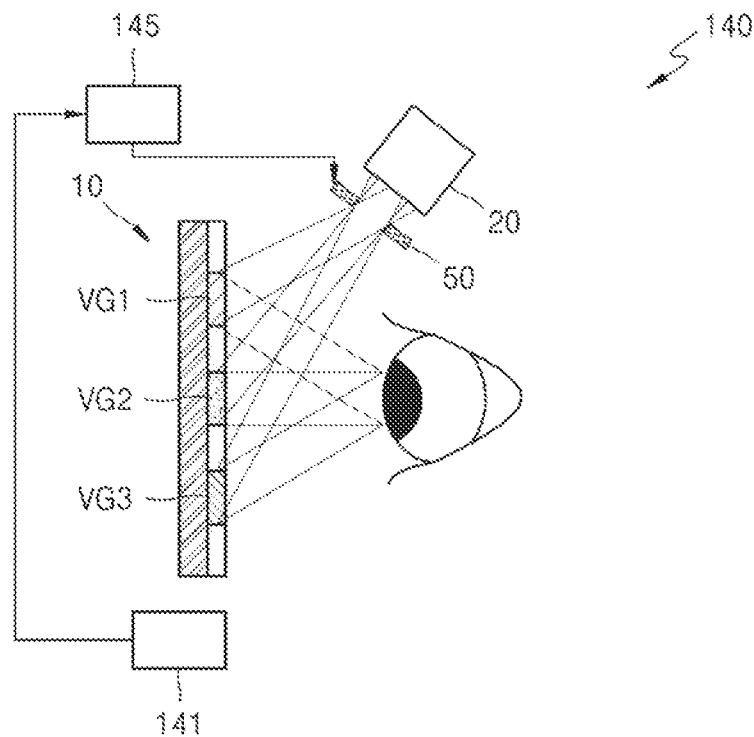
FIGS. 12, 13, 14, 15, 16, and 17 are views of configurations of display apparatuses capable of actively adjusting a beam diameter of light containing an image, according to other example embodiments.

For example, FIGS. 12 to 17 are views of configurations of display apparatuses capable of actively adjusting a beam diameter of light containing an image according to other example embodiments;

Referring to FIG. 12, a display apparatus 140 may further include an aperture 50, an eye tracker 141, and a processor 145. The aperture 50 is a beam diameter adjustment device arranged between the image providing device 20 and the combiner 10 and configured to adjust a beam diameter of light containing an image, which is to be incident on the plurality of volume gratings VG1, VG2, and VG3. To this end, the aperture 50 may have an opening which variably changes. The eye tracker 141 may measure a location and a size of the pupil of the observer in real-time and provide a measurement result to the processor 145. The processor 145 may control an operation of the aperture 50 based on information about the location or the size of the pupil of the observer, which is provided from the eye tracker 141. For example, the processor 145 may increase or decrease a diameter of the opening of the aperture 50 in response to a location change or a size change of the pupil of the observer.

Figure 13:
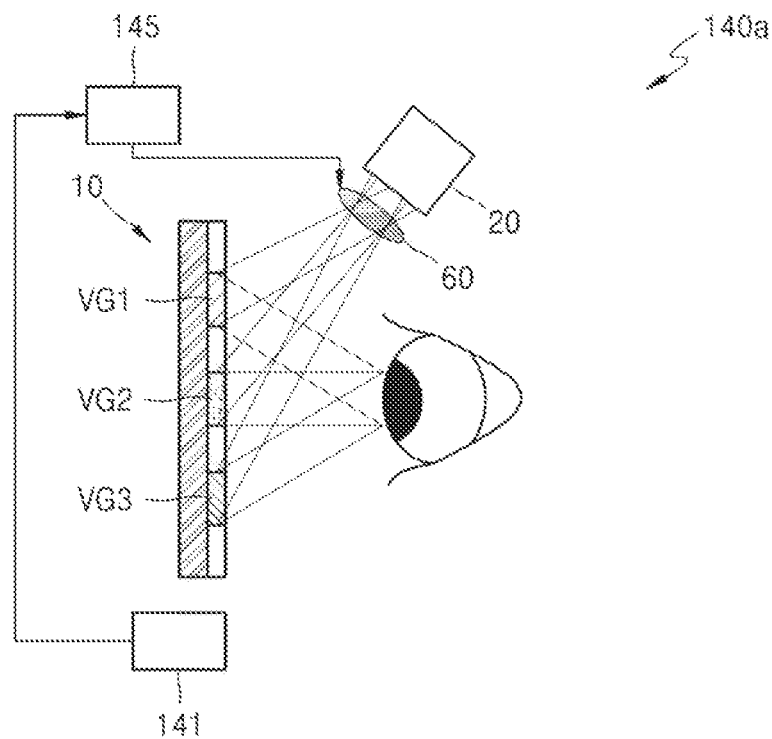

In addition, referring to FIG. 13, a display apparatus 140a may further include an adjustable lens 60, the eye tracker 141, and the processor 145. The adjustable lens 60 may be, for example, a variable focus lens between the image providing device 20 and the combiner 10. Because a beam diameter of light containing an image, which is incident on the combiner 10, changes according to a change in a focal length of the adjustable lens 60, the adjustable lens 60 may function as a beam diameter adjustment device. The processor 145 may increase or decrease the focal length of the adjustable lens 60 in response to information about a location or a size of the pupil of the observer, which is provided from the eye tracker 141.

Figure 14:
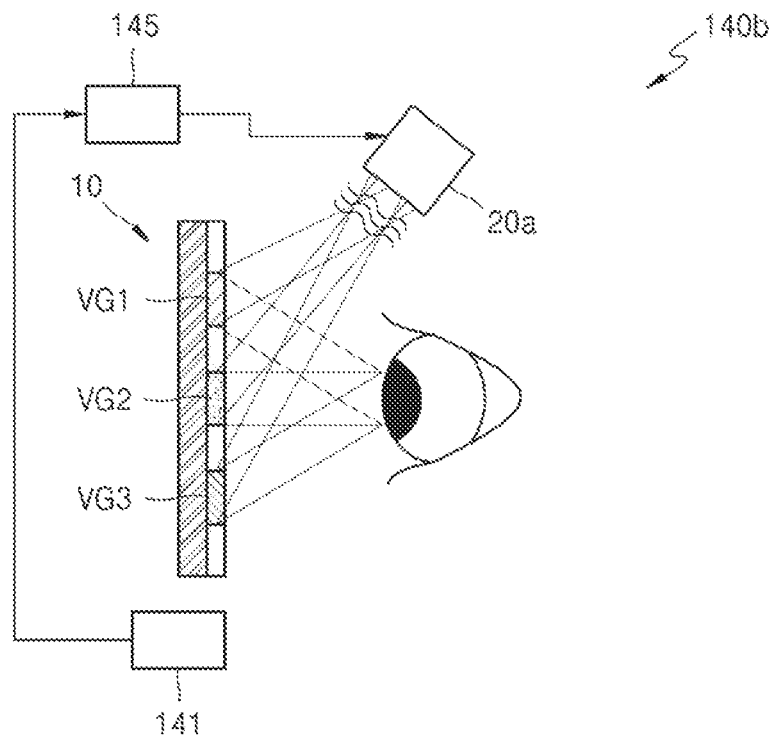

In addition, referring to FIG. 14, an image providing device 20a of a display apparatus 140b may be a holographic image forming device capable of actively adjusting a beam diameter. The display apparatus 140b may also further include the eye tracker 141 and the processor 145. The processor 145 may control the image providing device 20a in response to information about a location or a size of the pupil of the observer, which is provided from the eye tracker 141, and the image providing device 20a may increase or decrease a beam diameter of light containing an image according to the control of the processor 145. In this case, because the image providing device 20a may directly adjust the beam diameter of the light containing the image, a separate beam diameter adjustment device may not be used.

Figure 15:
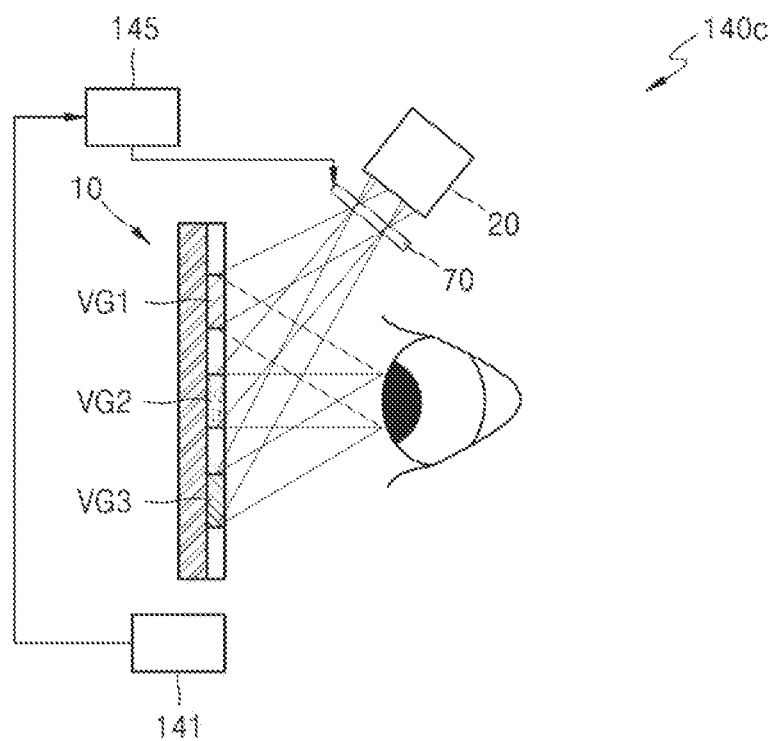

Referring to FIG. 15, a display apparatus 140c may further include a diffusion plate 70, the eye tracker 141, and the processor 145. The diffusion plate 70, used as a beam diameter adjustment device, may be arranged between the image providing device 20 and the combiner 10, and may have a variable diffusion angle. For example, the diffusion plate 70 may change a diffusion angle thereof while a haze characteristic is changed according to an electrical control. The processor 145 may increase or decrease the diffusion angle of the diffusion plate 70 in response to information about a location or a size of the pupil of the observer, which is provided from the eye tracker 141.

Figure 16:
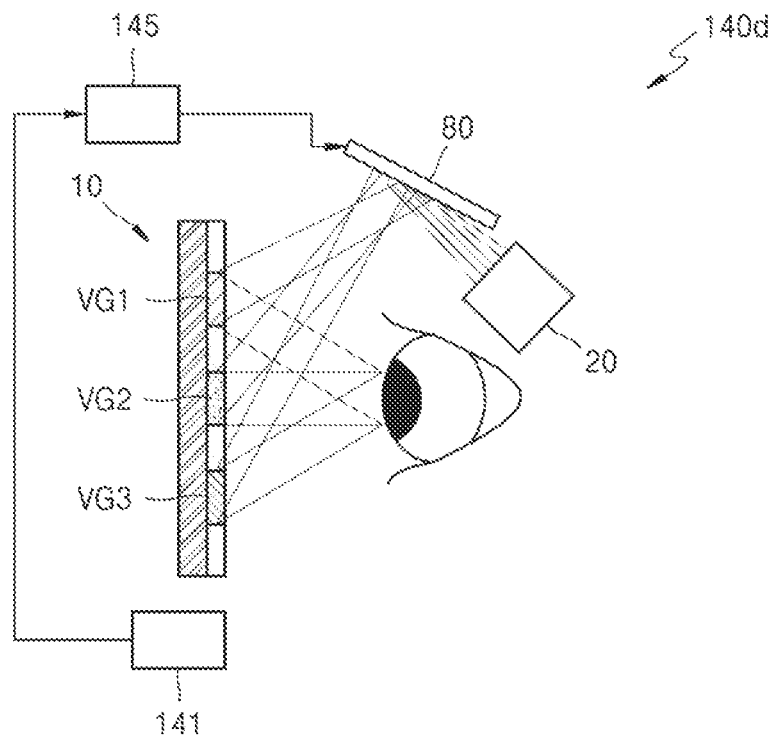

Referring to FIG. 16, a display apparatus 140d may further include a micro-electromechanical systems (MEMS) mirror array 80, the eye tracker 141, and the processor 145. The MEMS mirror array 80 used as a beam diameter adjustment device may include a plurality of micro-mirrors which are between the image providing device 20 and the combiner 10 and electromechanically operate. The MEMS mirror array 80 may freely adjust a direction of light reflected from the plurality of micro-mirrors by independently controlling slopes of the plurality of micro-mirrors. For example, the MEMS mirror array 80 may electrically adjust a reflective region. The processor 145 may adjust a beam diameter of light to be incident on the combiner 10 by controlling the MEMS mirror array 80 in response to information about a location or a size of the pupil of the observer, which is provided from the eye tracker 141.

Figure 17:
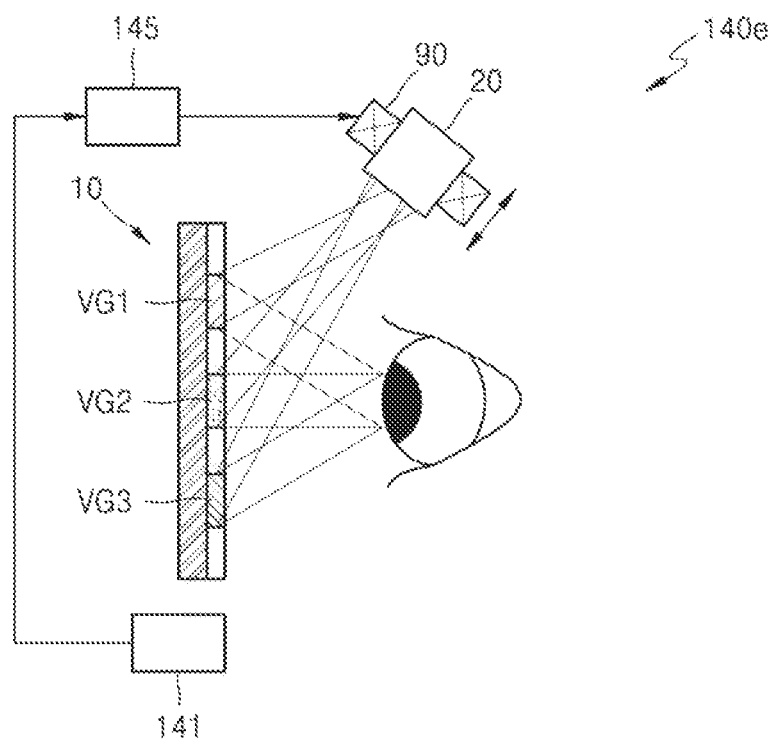

Referring to FIG. 17, a display apparatus 140e may further include an actuator 90, the eye tracker 141, and the processor 145. The actuator 90 may move the image providing device 20 to adjust a distance between the combiner 10 and the image providing device 20. For example, the actuator 90 may include a linear motor. Because a beam diameter of light containing an image, which is incident on the combiner 10, varies according to the distance between the combiner 10 and the image providing device 20, the actuator 90 may be used as a beam diameter adjustment device. The processor 145 may adjust the distance between the combiner 10 and the image providing device 20 by controlling the actuator 90 in response to information about a location or a size of the pupil of the observer, which is provided from the eye tracker 141.

Figure 18:
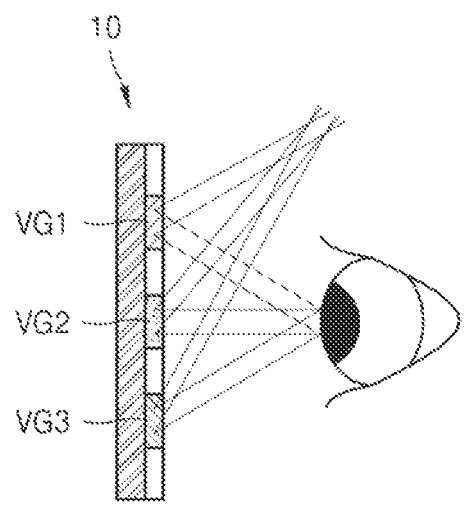
FIG. 18 illustrates an example in which a valid reaction area of an opening is adjusted based on pupil information of an observer in the example embodiments illustrated in FIGS. 12 to 17.

FIG. 18 illustrates an example in which an effective reaction area of an opening is adjusted based on pupil information of the observer in the example embodiments illustrated in FIGS. 12 to 17. To this end, a size (e.g., a width or a diameter) of the plurality of volume gratings VG1, VG2, and VG3 may be a little bit larger than a size necessary in a general case. For example, when the effective reaction area of the opening at a normal location of the pupil of the observer is about 1 mm, the size of the plurality of volume gratings VG1, VG2, and VG3 may be about 1.5 mm. In addition, a beam diameter of light containing an image, which is to be incident on the plurality of volume gratings VG1, VG2, and VG3, may be adjusted according to a location change of the observer. For example, the beam diameter of the light containing the image at the normal location of the pupil of the observer may be adjusted to about 1 mm. In addition, as a distance between the observer and the combiner 10 is closer, or when a size of the pupil of the observer is larger, the beam diameter of the light containing the image, which is to be incident on each volume grating VG1, VG2, or VG3 decreases. As the distance between the observer and the combiner 10 increases, or when the size of the pupil of the observer decreases, the beam diameter of the light containing the image, which is to be incident on each volume grating VG1, VG2, or VG3 increases.

According to the example embodiments described above, a change in a location or a size of the pupil of the observer may be actively responded. Particularly, because the plurality of volume gratings VG1, VG2, and VG3 of the combiner 10 react to only light of a particular wavelength, which is incident at a particular angle, even when a size of the plurality of volume gratings VG1, VG2, and VG3 increases, a transmittance of external light does not significantly decrease. Therefore, even without sacrificing the transmittance of external light, a change in a location or a size of the pupil of the observer may be responded.

Figure 19:
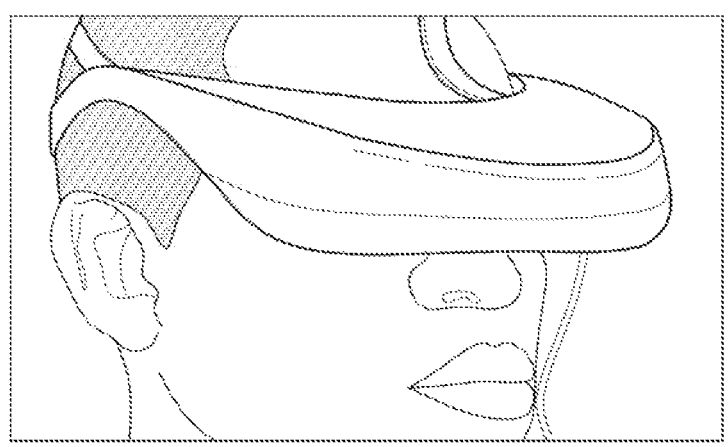
FIGS. 19, 20, and 21 show various electronic devices to which a display apparatus according to example embodiments are applicable.
Figure 20:
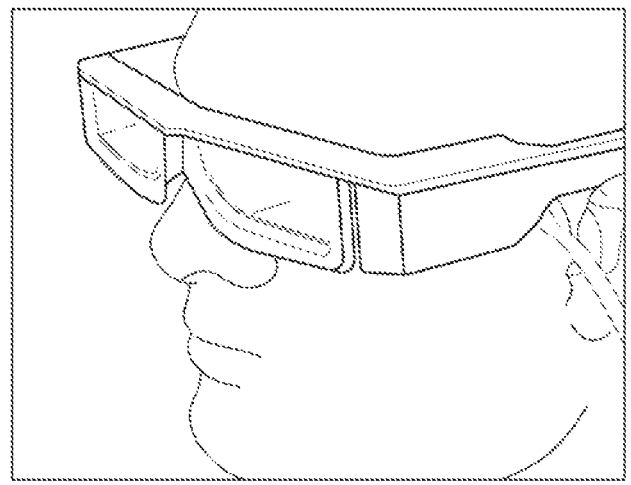
Figure 21:
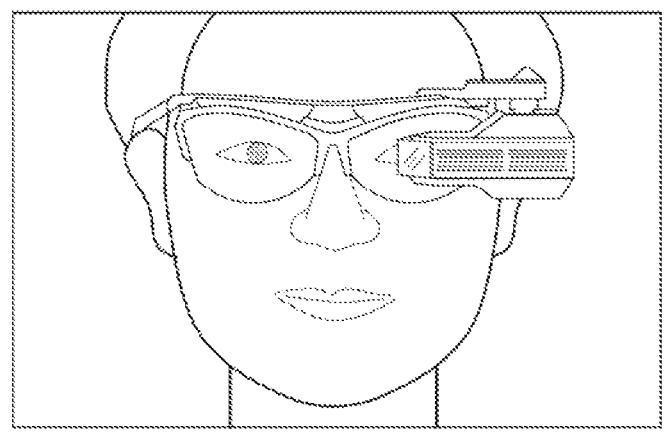

FIGS. 19 to 21 show various electronic devices to which the display apparatus according to the above-described example embodiments is applicable. As shown in FIGS. 19 to 21, the display apparatus may constitute a wearable device. In other words, the display apparatus may be applied to a wearable device. For example, the display apparatus may be applied to a head mounted display (HMD). In addition, the display apparatus may be applied to glasses-type displays, goggle-type displays, and the like. Wearable electronic devices shown in FIGS. 19 to 21 may be operated in conjunction with a smartphone. Such a display apparatus may be a virtual reality (VR) display apparatus, an AR display apparatus, or an MR display apparatus manufactured in the form of head mounted type, glasses type, or goggles type capable of providing VR or a virtual image and a real external landscape together.

In addition, the display apparatus may be provided in a smartphone, and the smartphone itself may be used as a VR display apparatus, an AR display apparatus, or an MR display apparatus. In other words, the display apparatus may be applied to a small electronic device (mobile electronic device) that is not the wearable device as shown in FIGS. 19 to 21. In addition, application fields of the display apparatus may vary. For example, the display apparatus may be applied not only to implementing VR, AR, or MR, but also to other fields. For example, the display apparatus may also be applied to a small television or a small monitor that a user may wear It should be understood that example embodiments described herein should be considered in a descriptive sense only and not for purposes of limitation. Descriptions of features or aspects within each example embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. A display apparatus comprising:
an image providing device configured to provide an image; and
a combiner configured to combine light containing the image, which is emitted from the image providing device, and light containing an external landscape,
wherein the combiner comprises:
a transparent substrate; and
a plurality of volume gratings on the transparent substrate, the plurality of volume gratings being configured to diffract the light containing the image emitted from the image providing device,
wherein each volume grating of the plurality of volume gratings has a first surface and a second surface facing each other,
wherein each volume grating of the plurality of volume gratings is configured to diffract light incident on the first surface and transmit therethrough light incident on the second surface without diffraction, and
wherein a distance between two adjacent volume gratings of the plurality of volume gratings is greater than or equal to a width of each volume grating of the plurality of volume gratings.

2. The display apparatus of claim 1, wherein each volume grating of the plurality of volume gratings is configured to diffract light incident on the first surface at a pre-defined incident angle toward a pre-defined direction.

3. The display apparatus of claim 1, wherein the light containing the image, which is provided from the image providing device to each volume grating of the plurality of volume gratings, is collimated parallel light.

4. The display apparatus of claim 3, wherein each volume grating of the plurality of volume gratings has an optical characteristic having no refractive power with respect to the light incident on the first surface.

5. The display apparatus of claim 1, wherein the light containing the image, which is provided from the image providing device to each volume grating of the plurality of volume gratings, is diverging light.

6. The display apparatus of claim 5, wherein each volume grating of the plurality of volume gratings is configured to collimate by diffraction the diverging light incident on the first surface into parallel light.

7. The display apparatus of claim 1,
wherein the plurality of volume gratings are arranged in a two-dimensional array on the transparent substrate.

8. The display apparatus of claim 7, wherein the image providing device is further configured to provide the light containing the image toward the first surface of each volume grating of the plurality of volume gratings, and
wherein the plurality of volume gratings are configured to diffract the light containing the image at different angles such that lights respectively diffracted by the plurality of volume gratings travel toward a single region.

9. The display apparatus of claim 7, wherein the first surface of each volume grating of the plurality of volume gratings has a circular shape, an oval shape, a quadrangular shape, or a hexagonal shape.

10. The display apparatus of claim 7, wherein some of the plurality of volume gratings are provided in a line along a first row, and remaining ones of the plurality of volume gratings are provided in a line along a second row adjacent to the first row, and volume gratings provided along the first row and volume gratings provided along the second row are provided to be mismatched with each other in a column direction.

11. The display apparatus of claim 7, wherein some of the plurality of volume gratings are provided in a line along a first row, and remaining ones of the plurality of volume gratings are provided in a line along a second row adjacent to the first row, and volume gratings provided along the first row and volume gratings provided along the second row are provided to face each other in a column direction.

12. The display apparatus of claim 1, wherein the width of each volume grating of the plurality of volume gratings range from 0.5 mm to 1.5 mm.

13. The display apparatus of claim 1, wherein the distance between two adjacent volume gratings of the plurality of volume gratings gradually increases or decreases away from a center of the combiner.

14. The display apparatus of claim 1, wherein the width of each volume grating of the plurality of volume gratings gradually increases or decreases away from a center of the combiner.

15. The display apparatus of claim 1, wherein the combiner further comprises:
a transparent light guide plate through which light travels by total reflection; and
an input coupler configured to guide the light containing the image, which is emitted from the image providing device, to an inside of the transparent light guide plate,
wherein the transparent light guide plate has a first surface and a second surface facing each other, and
wherein the plurality of volume gratings are provided on the second surface of the transparent light guide plate and configured to diffract the light containing the image toward the first surface of the transparent light guide plate.

16. The display apparatus of claim 15, wherein the plurality of volume gratings are provided such that the first surface of each volume grating is included inside the transparent light guide plate.

17. The display apparatus of claim 15, wherein the plurality of volume gratings are provided such that the first surface of each volume grating is in contact with the second surface of the transparent light guide plate.

18. The display apparatus of claim 1, wherein the plurality of volume gratings comprise:
a plurality of first volume gratings configured to diffract, at a first angle, light of a first wavelength band incident on the first surface at a pre-defined incident angle;
a plurality of second volume gratings configured to diffract, at a second angle that is different from the first angle, light of a second wavelength band that is different from the first wavelength band, incident on the first surface at the pre-defined incident angle; and
a plurality of third volume gratings configured to diffract, at a third angle that is different from the first angle and the second angle, light of a third wavelength band that is different from the first wavelength band and the second wavelength band, incident on the first surface at the pre-defined incident angle.

19. The display apparatus of claim 18, wherein the plurality of first volume gratings, the plurality of second volume gratings, and the plurality of third volume gratings are alternately provided one by one.

20. The display apparatus of claim 1, further comprising an eye tracker configured to track a location of a pupil of an observer and measure a size of the pupil of the observer.

21. The display apparatus of claim 1, wherein the display apparatus is a virtual reality (VR) display apparatus, an augmented reality (AR) display apparatus, or a mixed reality (MR) display apparatus of a head mounting type, an eyeglasses type, or a goggle type.

22. A display apparatus comprising:
an image providing device configured to provide an image;
a combiner configured to combine light containing the image, which is emitted from the image providing device, and light containing an external landscape; and
an eye tracker configured to track a location of a pupil of an observer and measure a size of the pupil of the observer,
wherein the combiner comprises a plurality of volume gratings configured to diffract the light containing the image emitted from the image providing device,
wherein each volume grating of the plurality of volume gratings has a first surface and a second surface facing each other, and
wherein each volume grating of the plurality of volume gratings is configured to diffract light incident on the first surface and transmit therethrough light incident on the second surface without diffraction,
wherein the image providing device is further configured to adjust a beam diameter of light incident on the first surface of each volume grating of the plurality of volume gratings, based on information with respect to the location of the pupil of the observer or information with respect to the size of the pupil of the observer.

23. The display apparatus of claim 20, further comprising a beam diameter adjustment device configured to adjust a beam diameter of light incident on the first surface of each volume grating of the plurality of volume gratings from the image providing device, based on information with respect to the location of the pupil of the observer or information with respect to the size of the pupil of the observer.

24. The display apparatus of claim 23, wherein the beam diameter adjustment device comprises one of an aperture having a variable opening, a lens having a variable focal length, a diffusion plate having a variable diffusion angle, a micro-electromechanical systems (MEMS) mirror array configured to electrically adjust a reflective region, and an actuator configured to move the image providing device to adjust a distance between the combiner and the image providing device.

25. The display apparatus of claim 23, wherein the beam diameter adjustment device is configured to decrease the beam diameter of light incident on the first surface of each volume grating of the plurality of volume gratings based on a distance between the combiner and the observer decreasing or the size of the pupil of the observer increasing, and to increase the beam diameter of the light incident on the first surface of each volume grating of the plurality of volume gratings based on the distance between the combiner and the observer increasing or the size of the pupil of the observer decreasing.

* * * * *